Feb. 8, 1944.   E. F. MILBANK   2,341,328
LUBRICATING APPARATUS
Filed March 13, 1940
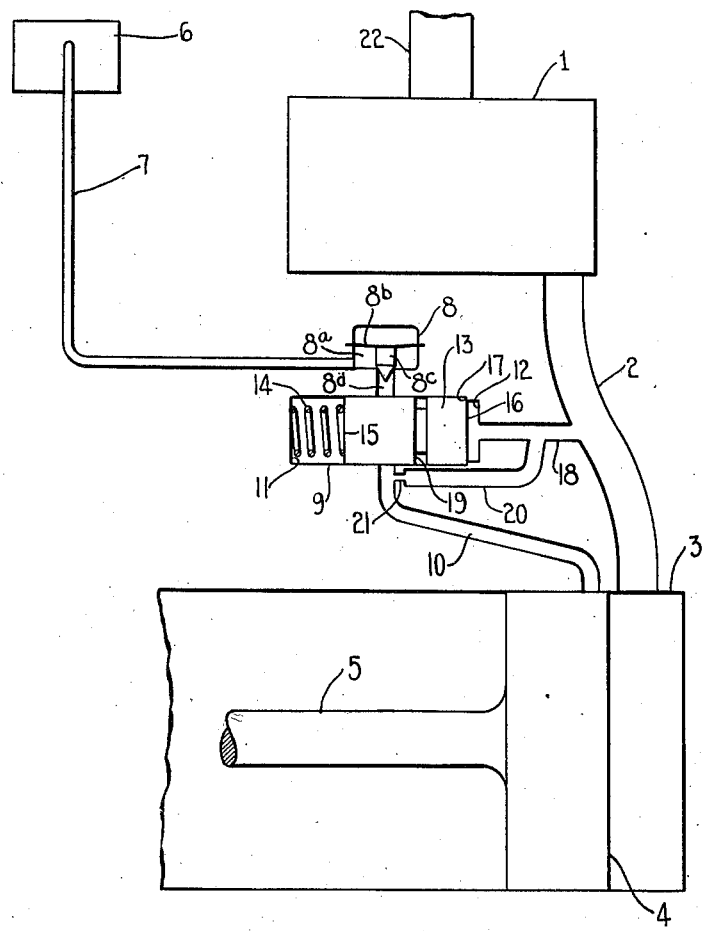
INVENTOR
Elmer F. Milbank
BY
Andrew K. Fouldo
his attorney Patented Feb. 8, 1944

2,341,328

UNITED STATES PATENT OFFICE 2,341,328

LUBRICATING APPARATUS

Elmer F. Milbank, Galesburg, Ill., assignor to Detroit Lubricator Company, Detroit, Mich., a corporation of Michigan Application March 13, 1940, Serial No. 323,657

14 Claims. (Cl. 184—55)

My invention relates generally to lubricating apparatus and more particularly to apparatus for the lubrication of steam engines.

An object of my invention is to provide means for supplying lubricant to an engine cylinder only during the power stroke.

A further object of the invention is to operate the lubricant supplying means by the inlet steam to the cylinder.

A further object is to provide a means for mixing the lubricant which is supplied to the cylinder with a portion of the inlet steam for insuring a proper atomization of the supplied steam and a consequent transmission thereof to the cylinder walls.

The invention consists in the new and novel arrangement of parts and their construction, and the novelty of which will be particularly pointed out and distinctly claimed.

The figure of the drawing is a schematic view of a portion of a steam locomotive embodying my lubricating apparatus.

Referring to the drawing by characters of reference, the numeral 1 designates a locomotive steam chest having a valve mechanism therein which controls the supply of steam passing through a main supply conduit 2 to a power cylinder 3. Steam pressure within the cylinder 3 forces a piston 4 to the left and transmits work to the drive wheel or other power applying means (not shown) through a piston rod 5. Oil for lubricating the walls of the cylinder 3 is supplied from a forced feed lubricator 6, at a pressure greater than the maximum steam pressure through a conduit means 7 to a chamber 8ª of a pressure operated check valve 8. A diaphragm 8ᵇ of the check valve 8 carries a valve element 8ᶜ and is normally loaded or biased in a direction to urge the element 8ᶜ against its valve seat. The diaphragm 8ᵇ is operable upon a predetermined pressure of the oil within the chamber 8ª to lift the element 8ᶜ from its seat to allow oil to flow into a conduit 8ᵈ. The conduit 8ᵈ connects the check valve 8 with an auxiliary cylinder 9. A conduit 10 conducts the lubricating oil from the cylinder 9 to the main or power cylinder 3. The conduit 8ᵈ and the conduit 10 preferably open radially through the cylinder side wall at diametrically opposite points and in a common plane perpendicular to the longitudinal axis of the cylinder 9.

The auxiliary cylinder 9 is cylindrical in shape with opposite facing end walls 11, 12 and in the present showing has its longitudinal axis parallel to the longitudinal axis of the power cylinder 3. A piston member 13 is positioned within and, due to its piston fit, cooperates with the side walls of the cylinder 9 to provide a slide or piston valve to control the flow of lubricating oil from the conduit 8ᵈ to the conduit 10. A helical coil compression spring 14 has one end abutting the end wall 11 and has its other end abutting one end 15 of the piston member 13 and acts to urge the piston member 13 to the right and into the position shown, with an end wall 16 of the piston member 13 against a shoulder 17 which is adjacent to but spaced from the cylinder end wall 12. The shoulder 17 prevents the piston member 13 from engaging the end wall 12 so that the steam which is supplied to the cylinder 9 through a conduit 18 can act at all times on substantially the entire area of the end wall 16. The conduit 18 has one end connected to the main supply conduit 2 and has its other end opening through the end wall 12 of the cylinder 9. The spring 14 determines the steam pressure which, when acting on the piston member end wall 16, is necessary to move the piston member 13 toward the left and to a position so that an annular passageway 19 formed in the side wall of the piston member 13 will come into alignment with the opening of the conduit 8ᵈ and of the conduit 10 so that oil may flow from the conduit 8ᵈ through the passageway 19 to the conduit 10. The passageway 19 is preferably a circumferential groove in the piston member 13. A conduit 20 connects the conduit 18 to the conduit 10 closely adjacent the opening of conduit 10 into the cylinder 9 and has, in the end portion adjacent the conduit 10, a flow-restricting orifice 21 which may, for example, be a ⅛" inside diameter hole, while the remainder of the conduit 20 may be of larger inside diameter.

The operation of the apparatus is as follows: The valve mechanism in the steam chest 1 may be mechanically connected to the driver of a locomotive in the usual manner or to any other part which is movable in a given predetermined relation with the piston 4. The valve mechanism so actuated periodically opens the conduit 2 to flow of live steam which is supplied through a conduit 22 leading from the steam generator (not shown). The live steam passes through the conduit 2 to the power cylinder 3 and acts to move the piston 4 toward the left. At the same time the steam is being supplied to the cylinder 3, steam passes through the conduit 18 and into the cylinder 9 to act against the piston member end wall 16. Subsequent to a predetermined minimum pressure being reached in the cylinder 9, the piston member 13 will move toward the left of the cylinder 9 compressing the spring 14 until the passageway 19 of the piston member 13 communicatively connects the conduit 8$^d$ with the conduit 10. As the force feed lubricator or oiler 6 is of course in operation, the conduit means 7 and check valve chamber 8$^a$ will be filled with oil under pressure. When the resistance of the loaded diaphragm 8$^b$ is overcome, the oil pressure acting therethrough will open the valve element 8$^c$ and permit the oil to pass into the conduit 9$^d$ where it is held by the closed valve 13 and in readiness for supply to the conduit 10 when the slide valve 13 is moved to open position. Upon opening of the slide valve 13 oil flows from conduit 8$^d$ into the passageway 19 and into conduit 10 on its way to the cylinder 3. Should the oil pressure in chamber 8$^a$ be sufficient to open the valve element 8$^c$ at the time the slide valve 13 is open, additional oil will flow from the conduit means 7 into conduit 8$^d$ and into conduit 10. At the same time steam is being supplied to the cylinder 9, the steam also passes through the conduit 20 and orifice 21 into the conduit 10 adjacent the cylinder 9 to pick up the oil admitted to conduit 10 by the piston member 13, to force it through the remainder of conduit 10, and to blow it in an atomized spray into the cylinder 3 where it finds its way to the walls thereof. It is particularly desirable to admit the steam to conduit 10 closely adjacent the cylinder 9 so that as soon as oil enters the conduit 10 it will be substantially immediately blown into the cylinder 3.

Subsequent to the ceasing of the supply of live steam and reduction of pressure within the cylinders 3 and 9, the spring 14 will move the piston member 13 against the shoulder 17 so that the passageway 19 will be out of its position of communicatively connecting the conduit 8$^d$ with the conduit 10. The piston-tight fit of the piston member 13 in this last-named position will act to prevent any oil from being supplied to the power cylinder 3.

It may now be seen that the apparatus provides a simple and positive means for supplying lubricating oil to the interior of a steam cylinder during the power stroke so that the walls thereof are properly lubricated with the minimum quantity of oil being used, and also since the oil is admitted only during the power stroke and on the steam inlet side of the piston, it is not immediately blown by the exhausting steam from the cylinder before it has served its prime purpose of lubricating the cylinder walls.

What I claim and desire to secure by Letters Patent of the United States is:

1. In a lubricating device, means for supplying oil under pressure, means for conducting the oil from said means to a working portion of an engine cylinder having a reciprocating piston, pressure operated valve means intercalated in said conducting means intermediate said supply means and the cylinder and having a portion to be subjected to steam pressure, conduit means for supplying steam under pressure to the cylinder, means controlling the flow of steam through said conduit means in accordance with the position of the piston, and means for connecting said portion to said conduit means intermediate said controlling means and the cylinder, said valve means being moved to open position by steam pressure acting upon said portion upon a predetermined increase in pressure within said conduit means being reached thereby to allow for flow of oil solely to the working portion of the cylinder and during the power stroke of the piston.

2. In a lubricating device, means for supplying oil under pressure, means for conducting the oil from said means to one end of an engine cylinder, pressure operated shut-off valve means intercalated in said conducting means intermediate said supply means and the cylinder and having a portion to be subjected to steam pressure, conduit means for supplying steam under pressure to the cylinder, means controlling the flow of steam through said conduit means for the working stroke of the engine, means for connecting said conduit means on the cylinder side of said controlling means to said portion, said valve means being normally positioned to stop flow of oil through said conducting means and being moved to open position by steam pressure acting upon said portion upon an increase in pressure within said conduit means being reached thereby to allow for flow of oil to the cylinder, and means for admitting steam to said oil conducting means at a point closely adjacent to said valve means thereby to blow the oil into the cylinder.

3. In a lubricating device, means for supplying oil under pressure, means for conducting the oil from said means to an engine cylinder, pressure operated valve means intercalated in said conducting means intermediate said supply means and the cylinder and having a portion to be subjected to steam pressure, conduit means for supplying steam under pressure to the cylinder, means for connecting said conduit means to said portion, said valve means being moved to open position by steam pressure acting upon said portion upon increase in steam pressure in said conduit means to allow for flow of oil to the cylinder, and conduit means connecting said connecting means to said conducting means at a point intermediate said valve means and the cylinder.

4. In a lubricating device, means for supplying oil under pressure, means for conducting the oil from said means to an engine cylinder, pressure operated valve means intercalated in said conducting means intermediate said supply means and the cylinder and having a portion to be subjected to steam pressure, conduit means for supplying steam under pressure to the cylinder, means for connecting said conduit means to said portion, said valve means being moved to open position upon steam pressure being supplied to said portion thereby to allow for flow of oil to the cylinder, conduit means connecting said connecting means to said conducting means at a point intermediate said valve means and the cylinder, and flow restricting means in said last-named conduit means.

5. In a lubricating apparatus for reciprocating type steam engines having a power transmitting piston movable within a power cylinder, means controlling the flow of steam to one end of the power cylinder in accordance with the position of the power piston within the cylinder, an auxiliary cylinder, means for supplying oil to said auxiliary cylinder under a pressure greater than the pressure of the steam in said steam supplying means, a conduit for flow of oil from said auxiliary cylinder to said one end of the power cylinder, a piston in said auxiliary cylinder and operable at one end of its stroke to close said conduit to flow of oil from said oil supplying means, means to move said auxiliary piston to said one end of its stroke upon closure of said steam controlling means, said auxiliary cylinder piston being operable at the other end of its stroke to open said conduit means to flow of oil from said oil supplying means, and means to move said auxiliary cylinder piston to said other end of its stroke upon opening of said steam controlling means and solely when the pressure in the power cylinder is above a predetermined value.

6. In a lubricating device, means for supplying oil under pressure, means for conducting the oil from said means to a working portion of an engine cylinder having a reciprocating piston, normally closed valve means intercalated in said conducting means intermediate said supply means and the cylinder and having a portion to be subjected to steam pressure, conduit means for supplying steam under pressure to the cylinder, means controlling the flow of steam through said conduit means in accordance with the position of the piston, means for connecting said portion to said conduit means intermediate said controlling means and the cylinder, said valve means being moved to open position by steam pressure acting upon said portion upon a predetermined increase in pressure within said conduit means being reached thereby to allow for flow of oil solely to the working portion of the cylinder and during the power stroke of the piston, and means for atomizing the oil supplied to the engine cylinder.

7. In a lubricating device for an engine having a cylinder with a reciprocating piston, means having a predetermined interrelated movement with the piston and operable to control the supply of steam to the cylinder, means for supplying oil under pressure, means for conducting the oil from said oil supplying means to the engine cylinder, said conducting means being operable to discharge the oil into the engine cylinder adjacent the outlet of said first-named means into the engine cylinder, controlling means intercalated in said conducting means intermediate said oil supplying means and the cylinder, and means actuated with the operation of said piston and directly controlling the opening movement of said controlling means so that oil may be supplied to the pressure side of said piston during the piston power stroke.

8. In a lubricating apparatus for steam engines having means for automatically supplying steam to an engine cylinder in accordance with the position of its working piston, conduit means for conducting steam to the engine cylinder and communicatively connected to the steam supplying means and opening into the engine cylinder, an auxiliary cylinder, means for supplying oil to said auxiliary cylinder under a pressure greater than the pressure of the steam supplied by the steam supplying means, conduit means connecting said auxiliary cylinder to the working portion of the engine cylinder and opening thereinto adjacent the opening of the first-named conduit means into the engine cylinder, a piston in said auxiliary cylinder and having a plurality of positions, said last-named piston when in one of said positions being operable to close said last-named conduit means to flow of oil from said oil supplying means, said last-named piston when in a second of said positions being operable to open said last-named conduit means to flow of oil from said oil supplying means, means interrelating the operation of said last-named piston with the operation of the piston in the engine cylinder so that said last-named piston is positioned in said second position when the steam supplying means is supplying steam to the engine cylinder thereby to supply oil solely to the working portion of the engine cylinder, and means for supplying fluid under the pressure to said last-named conduit thereby to force the oil passed by said last-named piston into the engine cylinder.

9. In a lubricating apparatus for steam engines having means for automatically supplying steam to an engine cylinder in accordance with the position of its working piston, an auxiliary cylinder, means for supplying oil to said auxiliary cylinder under a pressure greater than the pressure of the steam supplied by the steam supplying means, conduit means connecting said auxiliary cylinder adjacent the connection of the steam supplying means to the engine cylinder to the working portion of the engine cylinder, a piston valve in said auxiliary cylinder and having a position of rest at each end of its stroke, said valve when in one of said positions of rest being operable to close said conduit means to flow of oil from said oil supplying means, said valve when in a second of said positions of rest being operable to open said conduit means to flow of oil from said oil supplying means, said valve having means operable upon the occurrence of a fluid pressure for moving said valve to said second position, and conduit means in open communication with the working cylinder portion for transmitting fluid pressure to said valve means in accordance with the pressure in the working cylinder portion.

10. In a lubricating apparatus for steam engines, means for supplying steam to the engine cylinder, an auxiliary cylinder, means for supplying oil to said auxiliary cylinder under a pressure greater than the pressure of the steam in said steam supplying means, conduit means connecting said auxiliary cylinder to the engine cylinder, a piston valve in said auxiliary cylinder and having a limit of movement at each end of its stroke, said piston valve being operable at one of said limits to close said conduit means to flow of oil from said oil supplying means, said piston valve being operable at the other of said limits to open said conduit means to flow of oil from said oil supplying means, said valve having means operable upon the occurrence of a fluid pressure for moving said valve to said other of said limits, conduit means in continual communication with the working cylinder portion for maintaining a fluid pressure on said valve means in accordance with the fluid pressure in the working cylinder portion, and means for moving said valve to said one of said limits.

11. In a lubricating apparatus for steam engines, means for supplying steam to the engine cylinder, an auxiliary cylinder, means for supplying oil to said auxiliary cylinder under a pressure greater than the pressure of the steam in said steam supplying means, conduit means connecting said auxiliary cylinder to the engine cylinder, a piston valve in said auxiliary cylinder and acting at one end of its stroke to close said conduit means to flow of oil from said oil supplying means, said piston valve being operable to open said conduit means to flow of oil from said oil supplying means, said valve having means operable upon the occurrence of a predetermined fluid pressure for moving said valve to open position, conduit means in open communication with the working cylinder portion for transmitting a fluid pressure to said valve means in accordance with the fluid pressure in the working cylinder portion, and means opposing movement of said valve to said open position and determining the predetermined fluid pressure at which said valve means acts to move said valve to said open position.

12. In a lubricating apparatus for steam engines having a working cylinder and a working piston reciprocal therein, means for supplying steam to the engine cylinder, valve means intercalated in said steam supplying means for controlling the supply of steam to the engine cylinder in accordance with the position of the working piston therein, an auxiliary cylinder, means for supplying oil to said auxiliary cylinder under a pressure greater than the pressure of the steam in said steam supplying means, conduit means connecting said auxiliary cylinder to the engine cylinder adjacent the connection of the steam supplying means to the engine cylinder, a slide valve in said auxiliary cylinder and having two end stroke positions, said slide valve when in one of said positions being operable to close said conduit means to flow of oil from said oil supplying means, said slide valve when in the second of said positions being operable to open said conduit means to flow of oil from said oil supplying means, means connected to and operable by steam pressure to move said slide valve to said second position, conduit means interconnecting said connected means to said steam supplying means at a point intermediate said valve means and the engine cylinder, and means for moving said slide valve to said first position.

13. In a device of the character described for a reciprocating steam engine having a power cylinder with a piston therein, means for supplying steam to the cylinder through a side wall inlet transverse to piston travel, means for supplying oil under pressure, conduit means for flow of oil from said oil supplying means to the cylinder, said conduit means having an opening through the side wall of the cylinder and closely adjacent to the plane of said steam inlet, said opening being positioned and arranged close to the end wall of the cylinder and relative to the stroke of the piston such that the piston and said opening cooperate to form a slide valve controlling flow of oil to the cylinder during the power stroke of the piston, and valve means controlled in accordance with the operation of the piston and acting to close said conduit means upon the discharge stroke of the piston.

14. A lubricating apparatus for a reciprocating steam engine comprising a working steam cylinder having a piston therein, a steam inlet conduit leading to said cylinder, valve mechanism controlling the steam supply through said conduit, a lubricant supply line having a port which opens into said cylinder through a side wall thereof and at one end portion thereof adjacent the opening of said conduit thereinto, said supply line port and the piston cooperating to form a slide valve, means to supply lubricant under pressure to said line, a steam actuated plunger valve closing said line and interposed between said supply means and said cylinder, a conduit leading to said plunger valve from said steam conduit, said last-named conduit communicating with said steam conduit between said valve mechanism and said cylinder, said plunger valve having a passageway for flow of lubricant from said supply means to said cylinder, said plunger valve being moved by pressure of the steam admitted to said last-named conduit upon operation of said valve mechanism to permit flow of lubricant through said passageway, means to supply steam to said line for transmitting to said cylinder the lubricant passed by said plunger valve, and means to return said plunger valve to line closing position.

ELMER F. MILBANK.